US011285953B2

(12) United States Patent
Burca

(10) Patent No.: US 11,285,953 B2
(45) Date of Patent: Mar. 29, 2022

(54) DETERMINING VISIBILITY DISTANCES BASED ON A DYNAMIC FIELD OF VIEW OF A VEHICLE

(71) Applicant: Continental Automotive GmbH, Hannover (DE)

(72) Inventor: Cristian Burca, Timisoara (RO)

(73) Assignee: Continental Automotive GmbH, Hannover (DE)

( * ) Notice: Subject to any disclaimer, the term of this patent is extended or adjusted under 35 U.S.C. 154(b) by 283 days.

(21) Appl. No.: 16/450,184

(22) Filed: Jun. 24, 2019

(65) Prior Publication Data

US 2020/0001877 A1    Jan. 2, 2020

(30) Foreign Application Priority Data

Jun. 28, 2018    (EP) ........................................ 8465543

(51) Int. Cl.
*G01C 22/00*        (2006.01)
*G05D 1/00*         (2006.01)
*B60W 30/18*        (2012.01)

(52) U.S. Cl.
CPC ..... *B60W 30/18163* (2013.01); *G05D 1/0088* (2013.01); *B60W 2400/00* (2013.01); *B60W 2554/00* (2020.02); *G05D 2201/0213* (2013.01)

(58) Field of Classification Search
CPC ....... B60W 30/18163; B60W 2554/00; B60W 2400/00; G05D 1/0088; G05D 2201/0213
USPC ........................................................... 701/23
See application file for complete search history.

(56) References Cited

U.S. PATENT DOCUMENTS

| | | | |
|---|---|---|---|
| 9,221,396 B1 | 12/2015 | Zhu et al. | |
| 2011/0025529 A1* | 2/2011 | Uechi | G08G 1/166 340/905 |
| 2013/0076787 A1* | 3/2013 | Mathieu | B60R 1/00 345/633 |
| 2018/0118144 A1* | 5/2018 | Yoshihira | G08G 1/16 |
| 2018/0148053 A1* | 5/2018 | Lee | B60W 30/146 |
| 2019/0072648 A1* | 3/2019 | Iwai | G01S 7/4808 |
| 2019/0092347 A1* | 3/2019 | Kim | B60R 1/00 |

OTHER PUBLICATIONS

Extended European Search Report and Examination Report for European Patent Application No. 18465543.9, dated Jan. 31, 2019, 10 pages, European Patent Office, Munich, Germany.

* cited by examiner

*Primary Examiner* — Mahmoud S Ismail
(74) *Attorney, Agent, or Firm* — W. F. Fasse

(57) ABSTRACT

A method and a system determine visibility distances based on a dynamic Field of View (FoV) of a subject vehicle. A vehicle incorporates the system. Map polygons are created, each of which determines edges of a road in a map of the surroundings of the subject vehicle. Further, visible areas are determined in the map by intersecting the map polygons with the dynamic FoV. Based on the visible areas, a visibility distance for the road is determined.

12 Claims, 3 Drawing Sheets

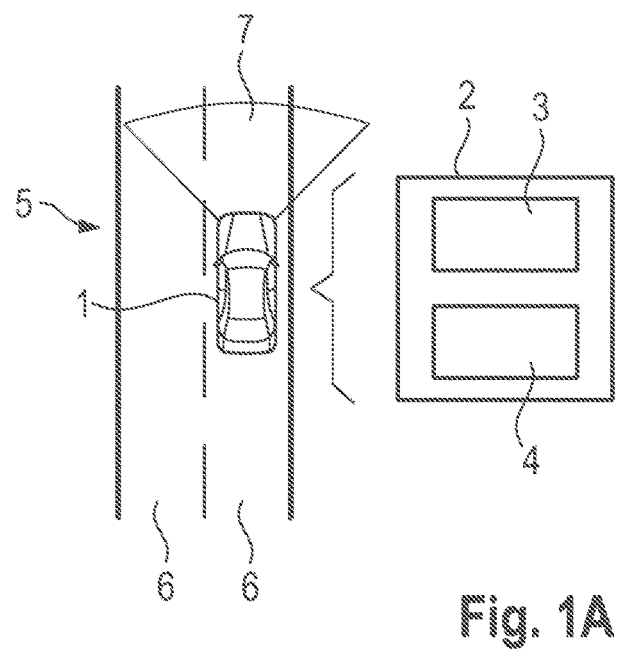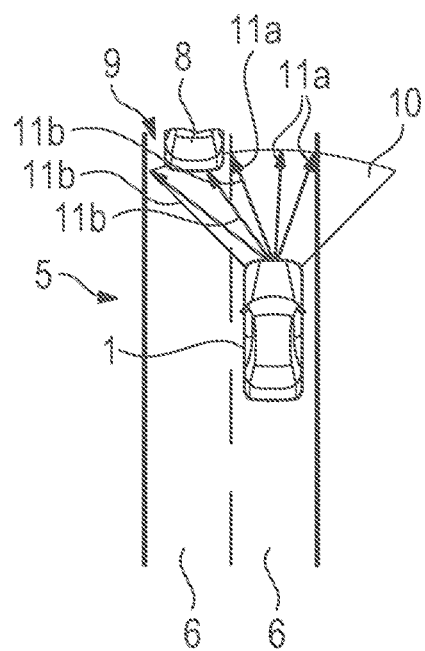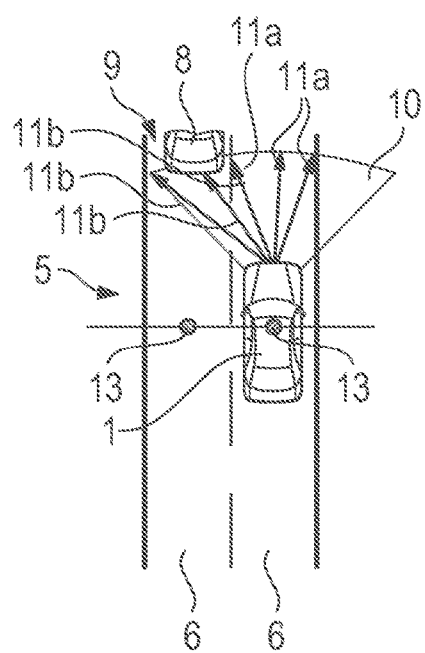
Fig. 1A
Fig. 1B
Fig. 1C

DETERMINING VISIBILITY DISTANCES BASED ON A DYNAMIC FIELD OF VIEW OF A VEHICLE

FIELD OF THE INVENTION

The present invention relates to a method for determining visibility distances based on a dynamic Field of View (FoV) of a subject vehicle, also called an ego vehicle, and to a system configured to determine visibility distances based on a dynamic Field of View (FoV) of an ego vehicle as well as to a vehicle comprising the system.

BACKGROUND INFORMATION

Vehicles, particularly autonomous vehicles like autonomous cars and unmanned ground vehicles capable of sensing their environment and navigating without human input, are equipped with sensors that can detect objects in the surroundings of the vehicle. Such vehicles combine a variety of techniques to perceive their surroundings, including radar, laser light, GPS, odometry and computer vision. Advanced control systems of autonomous vehicles interpret sensory information to identify appropriate navigation paths, as well as obstacles and relevant signage. The autonomous vehicles must have control systems that are capable of analyzing sensory data to distinguish between different static and/or dynamic objects on the road.

Especially overtaking maneuvers are a big challenge in autonomous driving. Multiple safety measures need to be fulfilled before a decision can be made whether it is safe to perform an overtaking maneuver. One key is the visibility factor. The vehicles are often equipped with high performance sensors in order to be able to detect objects in the surroundings even at high distances with high precision. The farther the sensors can detect and the more precise they are the safer are the decisions about overtaking maneuvers.

To increase reliability and exclude false negative objects detected by sensors, the sensors are placed at certain positions on the vehicle with calculated yaw angles, so that their respective Fields of View (for short: FoVs) overlap in critical areas around the vehicle. This overlapping brings a higher confidence in true positive detection and for target areas covered by several sensors, e.g. more than 3 sensors, the errors are limited to almost 0. Thus satisfactory results in dynamic and static object detection can be achieved.

Regarding the decision making for overtaking maneuvers, one option is to increase the amount and precision of data about objects in the surroundings of the vehicle ("what one wants to know") instead of studying also information that can be derived from the available data ("what one doesn't know").

In many situations it is advantageous to be able to state that the sensor system is not capable to detect anything in certain areas and differentiate this statement from the supposition that nothing is there.

One problem is that the idea to increase performance of sensors to achieve safe decision making for maneuvers like the overtaking maneuver may not be sufficient, because sensors mounted on vehicles will never be able to detect blind spots ("behind a corner"), e.g. the area behind an object such as a vehicle on an adjacent lane.

This means that in a complex traffic scenario there will always be areas that will be tagged as unknown not only because the sensors are limited in distance of detection, but because of occlusions (or: obstruction) due to objects in the surroundings of the vehicle. Hence, including more and more high technology devices in the object detection system of vehicles may be beneficial for the precision of the acquired data, but may in some cases not be sufficient for scenario understanding and decision making regarding complex maneuvers like the overtaking maneuver.

SUMMARY OF THE INVENTION

An object of the present invention is to solve, or at least alleviate, the problems discussed above. In particular, the object is to provide a way to identify a 2D/3D area of a road in the surroundings of a subject vehicle, i.e. ego vehicle, that is not visible to sensors of the ego vehicle, although said 2D/3D area is inside the theoretical Field of View (FoV). A further object of the present invention is to provide a way to derive a projected FoV on the current lane, adjacent lane and/or road in order to detect what distance ahead and/or behind the ego vehicle can be detected by the sensors or in other words how far the "visibility" of the sensors reaches.

Additionally, the present invention provides a way to determine a dynamic FoV in a map of the surroundings of the ego vehicle and a precision or probability of true positive detection in any point of the map as well as a way to represent said dynamic FoV and said precision/probability of true positive detection.

The term "surroundings" in the present context should in particular be understood to mean an environment around the ego vehicle up to a predetermined, or variable, distance, preferably up to 300 meters, more preferably up to 250 meters, most preferably up to 200 meters and in particular up to 150 meters.

These objects can be achieved by the methods, the system and the vehicle according to the several aspects of the invention as set forth herein. Refinements and advantageous variations of the present invention are also disclosed.

According to a first aspect of the present invention a method of determining visibility distances based on a dynamic Field of View (FoV) of an ego vehicle comprises the following steps:

a) Initializing the dynamic FoV based on sensor data of at least one sensor of the ego vehicle.
b) Creating map polygons, each of which determines edges of a road in a map of the surroundings of the ego vehicle.
c) Determining visible areas in the map by intersecting the map polygons with the dynamic FoV.
d) Determining a visibility distance for the road based on the visible areas.

According to a second aspect of the present invention, a system configured for determining visibility distances based on a dynamic Field of View (FoV) of an ego vehicle comprises at least one sensor. The sensor is configured to detect objects in the surroundings of the vehicle. The system further comprises a controller. The controller is configured to a) initialize the dynamic FoV based on sensor data of the at least one sensor of the ego vehicle. The controller is further configured to b) create map polygons, each of which determines edges of a road in a map of the surroundings of the ego vehicle. The controller is further configured to c) determine visible areas in the map by intersecting the map polygons with the dynamic FoV. The controller is further configured to d) determine a visibility distance for the road based on the visible areas.

According to a third aspect of the present invention a vehicle, particularly an autonomous vehicle, is provided which comprises the system according to the second aspect as described above.

The ego vehicle can be an autonomous vehicle. The ego vehicle can have a sensor configuration comprising the at least one sensor that is configured to cover as much as possible of the surroundings of the ego vehicle.

The surroundings are measured dynamically by the at least one sensor. The at least one sensor is configured to detect objects in the surroundings of the ego vehicle. The at least one sensor further can be a radar sensor, a Light Detection And Ranging (LiDAR) sensor, an ultra-sonic sensor and/or the like.

The at least one sensor detects objects around the ego vehicle and generates sensor data with information about the detected objects comprising the current location of the object. The sensor data can comprise a set or list of detected static and dynamic objects. The sensor data can also comprise further information about each object like length, width, height and/or velocity and the like.

The ego vehicle can comprise more than one sensor, where the sensors each can use a different technology and/or have a different range of detection and/or a different precision of detection and/or a different orientation with respect to the ego vehicle. If the ego vehicle comprises more than one sensor, the detection areas of the sensors advantageously overlap each other.

The sensors may have different detection areas regarding shape, detection range, orientation, and precision of detection. Based on the sensor data generated by the at least one sensor the dynamic FoV is initialized. The dynamic FoV describes the current actual FoV of the at least one sensor at the present time point without blind spots due to occlusions.

The dynamic FoV can be a combination of the detection areas (ideal FoVs) of several sensors of the ego vehicle. During initializing the dynamic FoV the detection areas, which may be partially overlapping one another, are combined to form the dynamic FoV. Further, invisible areas due to occlusions are subtracted from the detection areas such that the dynamic FoV is initialized representing the actual visible area covered by the sensors.

The occlusions are based on static and dynamic objects like other vehicles, pedestrians, traffic signs or traffic lights and the like in the surroundings of the ego vehicle as well as a road geometry like a slope, a curvature of the road and/or the like. The map of the surroundings of the ego vehicle can be provided from an external or internal instance or module.

Based on information contained in the map or provided with the map the road where the ego vehicle is driving on is delimited in the map by creating map polygons that define the borders of the road in the map. The visible areas in the map which can be observed (or, in other words, "seen" or "sensed") by the at least one sensor are determined by combining the information of the dynamic FoV with the information about the road in form of the map polygons.

Thereto the map polygons delimiting the road in the map are intersected with the dynamic FoV specifying the areas that can actually be observed by the at least one sensor at the current time point. Thereby a projected FoV comprising information for the present time point about which areas or parts of the road can be observed by the at least one sensor is generated in form of visible areas in the map. Based on said visible areas the visibility distance for the road is determined. The visible areas are evaluated or measured, respectively and the visibility distance for the road in the map is derived.

Moreover, visibilities can be determined which represent the length of the visible area in one respective direction. For each direction a minimal and/or maximal visibility can be determined. The visibility distance is projected straight forward in direction of the road from a midpoint of the road. The midpoint of the road is always located in the center of the road. A first midpoint is located at the beginning of the ego vehicle and in the center of the road. A subsequent midpoint is located at the end of the visibility distance. There a subsequent visibility distance based on respective visibilities may be derived. This iterative procedure can be continued for a certain length of the road. Also a visibility range and or mean visibility range based on the minimal and maximal visibility or visibility distance may be determined. The term "present time point" refers in particular to an instance in time or a short timespan e.g. up to about 1 ms [millisecond] or even up to 5 s [seconds]. The steps a) and b) may also be executed in an inverted sequence or in parallel.

Based on the visibility distance a decision making process e.g. for determining if a certain maneuver can safely be performed can be provided with additional data in order to improve the basis for the decision. This increases safety of the decision making process and reduces the probability of bad decisions and therefore also the probability of accidents. In particular the safety of overtaking maneuvers of autonomous vehicles can be increased based on the visibility distance.

According to advantageous embodiments of the present invention, step a) regarding initializing the dynamic FoV comprises the following steps:

a1) for each sensor of the ego vehicle, initializing an ideal FoV;

a2) for each sensor, determining occlusions based on the sensor data of the respective sensor and creating non-visible polygons based on the occlusions;

a3) for each sensor, subtracting the respective non-visible polygons from the respective ideal FoV forming an altered FoV;

a4) unifying (or: combining) the altered FoVs forming the dynamic FoV.

Fusion algorithms collect information from every sensor of the ego vehicle and output sensor data that can comprise a set/list of static and dynamic objects that are present around the autonomous vehicle. For each ideal FoV a polygon of points forming the respective ideal FoV can be created.

Starting with the ideal FoV or, in other words, a theoretical detection area of each sensor (e.g. in the polygon representation) a non-visible area generated by the occlusions represented as non-visible polygons is subtracted to generate the altered FoV. The non-visible area/polygons are created by projecting from each sensor position the edges of the detected objects on a horizon of the map. The altered FoVs represent the actual detection area that can be observed by the respective sensor. The altered FoVs of each sensor are combined or summed up (e.g. by simple polygon unification) in order to generate the dynamic FoV for the entire surroundings of the vehicle. The steps a1) and a2) may also be executed in inverted sequence or in parallel.

Especially by utilizing more than one sensor, the precision/probability of a true positive detection of objects can be increased and thereby a decision making process for maneuvers like the overtaking maneuver can be made more reliable and safe.

According to advantageous embodiments of the present invention, in step d) the visibility distances start at a midpoint of the road. The midpoint is located in a center of the road and on a 0-longitudinal coordinates line running perpendicular to a length direction of the ego vehicle.

The 0-longitudinal coordinates line may run through a point of the ego vehicle that is different from the location of a sensor of the ego vehicle. By using the midpoint on the 0-longitudinal coordinates line the visibility distance is measured from a common base line. This improves comparability of different visibility distances.

According to some advantageous embodiments of the present invention, the midpoint is determined based on information from the map of the surroundings.

The map of the surroundings with the map polygons provides information about the width of the road or lanes of the road which is used to determine the center of the road or lane.

According to some advantageous embodiments of the present invention, in step a2) the occlusions are determined based on static or dynamic objects or road geometry identified based on the sensor data of the respective sensor.

The actual detecting area (altered FoV) of a sensor changes only with the movement of the ego vehicle for occlusions due to static objects. Dynamic objects which move with a certain velocity relative to the ego vehicle change the actual detecting area (altered FoV) of a sensor based on said relative velocity.

Due to considering static and/or dynamic objects the precision and safety of decision making processes based on the visibility distances can be increased.

According to some advantageous embodiments of the present invention, in step a4) the altered FoVs are unified for, or at, a predefined height.

The predefined height is a height over ground level where the ego vehicle is located. The predefined height may be higher than 10 cm [centimeters] and preferably higher than 50 cm.

Considering only sensor data at the predefined height and generating the dynamic FoV from the altered FoVs at this predefined height ensures that only relevant objects are detected and considered in determining the visibility distance. This increases the reliability of a decision making process based on the visibility distance.

According to some advantageous embodiments of the present invention, in step b) each of the map polygons determines edges of lanes of the road. Further, in step d) for each lane of the road a respective visibility distance is determined.

The map polygons delimit the road topology received from the map based on single lanes of the road. The map polygons delimiting single lanes are used to determine projected FoVs (which areas or parts of the lane can be observed by the respective sensor) of the lane of the ego vehicle as well as of the adjacent lanes. Therefrom the visibility distances for every single lane of the road, namely of the lane where the ego vehicle moves and of adjacent lanes, are determined.

On roads with multiple lanes it is advantageous to determine the visibility distance for every lane in order to make decisions about maneuvers like the overtaking maneuver even safer and still more reliable.

According to some advantageous embodiments of the present invention, in step d) for each lane of the road and the road a respective visibility distance is determined.

Besides the visibility distance for every lane of the road, also a combined visibility distance of the whole road may be generated. The visibility distance of the road can be the shortest visibility distance of the visibility distances of the lanes. The visibility distances for every lane can start at a midpoint of the respective lane. The midpoints are in the center of the respective lane and on the 0-longitudinal coordinates line running perpendicular to a length direction of the ego vehicle. The midpoints of each lane may be determined based on information from the map of the surroundings.

The decision making process about whether to initiate a certain maneuver can be based on only one single visibility distance and not on every available visibility distance in order to reduce the effort for making the decision.

According to some advantageous embodiments of the present invention, in step b) the map polygons are created based on map data, particularly map data from a navigation system of the ego vehicle, and localization data, particularly localization data from a GPS system of the ego vehicle.

High precision localization methods like particle filtering or high precision localization sensors like high precision GPS sensors combined with high definition maps from the navigation system enable identification of the location or position of the ego vehicle on the road with a high precision. High precision in this context means discrimination of the position/location in the range of centimeters.

The precise localization of the ego vehicle increases the precision of the visibility distances, which are related to the geometries of the road and/or lanes. Thus, the safety and reliability of decision making processes that are based on the visibility distances can be increased.

According to some advantageous embodiments of the present invention, in step d) the visibility distance or visibility distances are determined for the road or lanes of the road in front of and/or in the back of the ego vehicle.

According to some advantageous embodiments of the present invention, in step a) the initialization of the dynamic FoV is also based on information about road geometry of the road derived from the map of the surroundings of the ego vehicle.

Along with object occlusions, road geometry influences like slopes are considered. For example, a slope of the road can be derived from the (high definition) map and/or from sensor data to determine if the visibility is affected by it.

This increases the accuracy of the determined visibility distance and, thus, also the reliability and safety of decision making processes for maneuvers based on the visibility distance.

According to a further aspect of the present invention, a method of autonomously changing a driving lane for an ego vehicle comprises the following sequential steps:
e) Making a decision based on the visibility distance or visibility distances determined for the road or lanes by the method as described above, dynamics of the ego vehicle and objects in the surroundings of the ego vehicle whether changing a driving lane is possible without collision.
f) Affecting an autonomous driving controller of the ego vehicle to change the driving lane if the decision is positive.

If the decision is negative, a warning may be put out in case a person in the ego vehicle attempts to assert manual control to change the driving lane.

From the visibility distance(s) determined according to the method and its refinements described above the area of the road or lanes, respectively, where the at least one sensor can observe or "see" are known. Together with the dynamics of the ego vehicle like velocity, acceleration and/or yaw rate etc. and information about the detected objects in the surroundings of the ego vehicle, particularly about other vehicles moving in adjacent lanes, that is derived from the sensor data, a decision whether it is advisable to change the driving lane from the lane the vehicle is currently moving on to a different lane, is made. Based on this decision, the autonomous driving controller is in case of a positive decision affected to effect a change of the driving lane.

Based on the visibility distance(s) including information about the area of the road or lanes where the at least one sensor can observe or "see" a reliable and informed decision whether to change the driving lane can be made. Thus, a reliable way to autonomously change a driving lane is provided.

BRIEF DESCRIPTION OF THE DRAWINGS

The present invention is subsequently explained in further detail by exemplary embodiments shown in the drawings. The exemplary embodiments only conduce better understanding of the present invention and in no case are to be construed as limiting for the scope of the present invention.

FIG. 1A: schematically shows an autonomous car according to the a third aspect of the invention which comprise's a system according to the second aspect of the present invention.

FIG. 1B: schematically shows an altered FoV of the sensor of the autonomous car of FIG. 1A.

FIG. 1C: schematically shows locations of midpoints for each lane of the road.

DETAILED DESCRIPTION OF EXAMPLE EMBODIMENTS OF THE INVENTION

Figure 2:
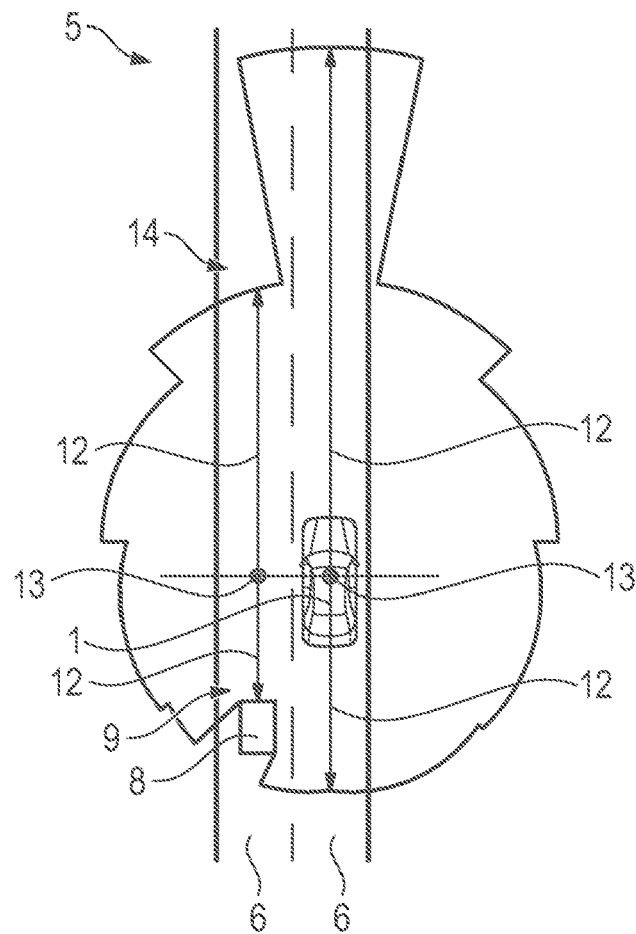
FIG. 2: schematically shows a dynamic FoV with visibility distances for each lane of the road in a forward direction and a backward direction from the respective midpoints.

A system for determining visibility distances based on a dynamic Field of View, FoV, of an ego vehicle according to an embodiment of the second aspect of the present invention will be described with respect to FIG. 1A to FIG. 4 in the following.

In FIG. 1A an ego vehicle 1, specifically an autonomous car 1 is schematically depicted. The autonomous car 1 comprises a system 2 configured for determining visibility distances based on a dynamic field of view, FoV, of the autonomous car 1.

The system 2 comprises at least one sensor 3 that can be a LiDAR sensor, a radar sensor, an ultra-sonic sensor and/or the like. The system 2 further comprises a controller 4. The controller can be a separate unit with a processor, memory and interface or be part of an autonomous driving controller of the autonomous car 1. The autonomous car 1 is moving on a road 5 with two lanes 6. The road 5 and/or lanes 6 are delimited by map polygons in a map of the surroundings of the autonomous car 1 provided by a navigation system of the autonomous car 1. The sensor 3 has an area in which it can detect structures. The maximal detection area is the ideal FoV 7.

In FIG. 1B detection of objects is schematically depicted. When an object 8 is located within the detection area, the ideal FoV 7 becomes partially occluded by the object 8. Here the object 8 is another vehicle, but the object 8 can be any dynamic or static object like other vehicles, pedestrians, traffic signs or traffic lights and the like in the surroundings of the ego vehicle as well as a road geometry like a slope, a curvature of the road and the like. The road geometry may also be derived from the map of the surroundings of the autonomous car 1.

The ideal FoV 7 is reduced by the obstruction or occlusion 9 due to the object 8 to an altered FoV 10 that has a blind spot behind edges of the object 8. If the autonomous car 1 comprises several sensors 3, the respective altered fields of view 10 are unified (S14 in FIG. 5) to a dynamic FoV (confer FIG. 2, reference sign 14). The dynamic FoV and the map polygons delimiting the road 5 and lanes 6 are intersected (S30 in FIG. 5) to generate a projected FoV with visible areas in the map of the surroundings. The visible areas give the areas of each lane 6 and/or the areas of the road 5 where the at least one sensor 3 can observe, or in other words "see", without blind spots due to any occlusion 9 caused by an object 8. Based on said visible areas, visibilities 11a, 11b are determined.

At least one visibility 11a, 11b is determined for each lane 6 and/or the road 5, wherein each visibility 11a, 11b describes the longest distance in a certain direction from the respective sensor 3 to an object 8 or to an end of the range of the respective sensor 3. Here the shortest visibility 11a for the lane where the autonomous car 1 is moving is selected as the one visibility for the respective lane 6. For the lane 6 where the object 8 (here another vehicle) is located the shortest visibility 11b is selected, too. The overall shortest visibility 11a, 11b can be selected as the visibility 11 for the road 5. Based on the visibility 11a for the lane 6 of the autonomous car 1 and the visibility 11b for the lane 6 of the object 8 or alternatively the visibility 11 for the road 5 is used for deriving at least one visibility distance.

In FIG. 1C midpoints 13 are schematically depicted. For each lane 6 of the road 5 there is a respective midpoint 13 determined based on the information of the map of the surroundings. Each midpoint 13 is in the center of the respective lane 6. The midpoints 13 are on a 0-longitudinal coordinates line that runs perpendicular to a length direction of the autonomous car 1 and in the center of each lane 6. Here only one sensor with one FoV 7 is depicted. The left midpoint 13 on the lane adjacent to the autonomous car 1 can only be determined if another sensor with another FoV (not depicted) covers this area, where the respective midpoint 13 resides. The determination of midpoints and visibility distances for all lanes 6 of the road 5 is described with reference to FIG. 2.

In FIG. 2 a dynamic FoV 14 composed of several FoVs 7 of several sensors of the autonomous car 1 is schematically depicted. Based on the visibilities 11a, 11b for each lane 6 of the road 5 a visibility distance 12 in a forward direction and a visibility distance 12 in a backward direction of the autonomous car 1 is determined. The visibility distances 12 start at the respective midpoint 13 of the respective lane, which midpoints 13 are on the 0-longitudinal coordinates line that runs perpendicular to the length direction of the autonomous car 1 and in the center of each lane 6.

The visibility distance 12 in each direction and in each lane can reach as far as the maximal visibility of the dynamic FoV 14 which is based on the visibilities 11 of the sensors of the autonomous car 12 in the respective direction. An object 8 in the adjacent lane 6 causes an occlusion 9 of the dynamic FoV 14. Due to this occlusion 9, the visibility distance 12 of the adjacent lane 6 in the backward direction (with respect to the ego vehicle) is shorter than it would be without the occlusion 9 due to the object 8.

Figure 3:
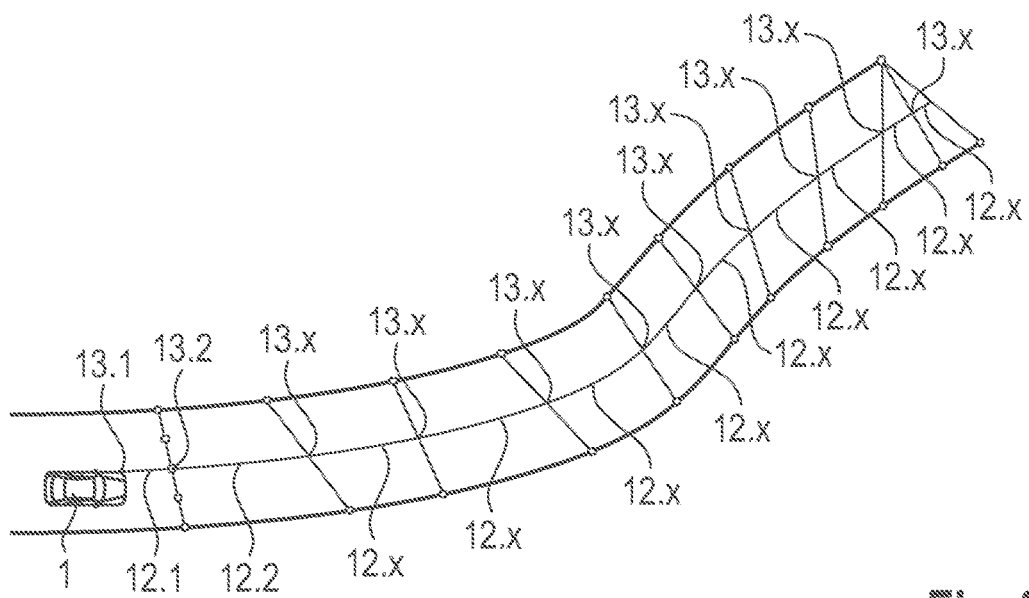
FIG. 3: schematically shows consecutive visibility distances of a road.

FIG. 3 depicts several visibility distances 12 for the road 5. The visibility distances 12 can also be derived for every lane 6 of the road 5. From the map of the surroundings a midpoint 13 of the road 5 or of the respective lane 6 is derived. The midpoint 13 is always located in the center of the road 5 or lane 6, respectively. A visibility distance 12.1 is projected straight forward in direction of the road from a midpoint 13.1. A subsequent visibility distance 12.2 is projected straight forward in the direction of the road from a subsequent midpoint 13.2 which is located at the end of the first visibility distance 12.1. This progression of visibility distances 12.x can be continued for a certain length of the road 5 or of the lane 6, respectively.

The visibility distance 12 is used for making a decision whether a change of lanes can be made with little risk of a collision. For making this decision, the velocity, acceleration and yaw rate of the autonomous car 1 and information about the object 8 (location, and, if the object 8 is a dynamic object, velocity and/or acceleration and/or a derived relative velocity and/or acceleration) are used together with the visibility distance(s) 12/12.x. If the decision is positive the autonomous driving controller of the autonomous car 1 is affected to control the autonomous car 1 such that the lane is changed.

Figure 4:
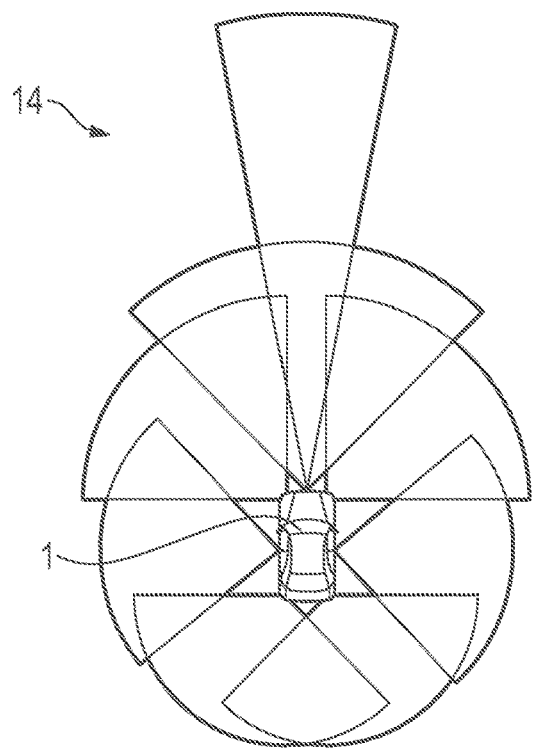
FIG. 4: schematically shows a dynamical FoV without any occlusion due to objects.

In FIG. 4 a dynamic FoV 14 of the autonomous car 1 is schematically shown. The autonomous car 1 has 8 sensors with overlapping detection areas (ideal FoVs) which are depicted as dashed sections of circles of varying radii. Here no object is occluding any ideal FoV of the sensors, such that the dynamic FoV 14 is initialized as a superposition of all ideal FoVs without any blind spots due to an occlusion caused by a static or dynamic object.

Figure 5:
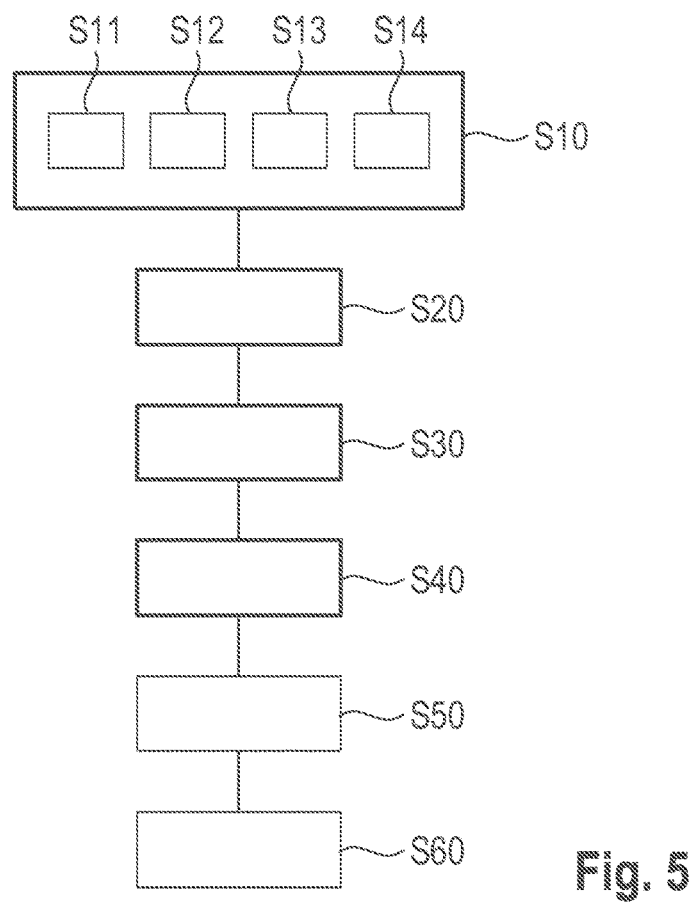
FIG. 5: shows a schematic flow diagram illustrating a method according to an embodiment of the first aspect of the present invention.

In FIG. 5 the method for determining visibility distances 12 based on the dynamic FoV 14 of the autonomous car 1 is schematically depicted as a flow diagram. The method according to FIG. 5 is usable with the system as described in the foregoing and may be adapted according to any modifications, options or variations described for that system and vice versa. For describing the method, some reference signs of FIG. 1A to FIG. 4 may be used for better illustration. However, it should be understood that the method of FIG. 5 is not limited to usage with the system 2.

S10 denotes initializing the dynamic FoV 14 based on sensor data of at least one sensor 3 of the autonomous car 1. Here the ideal FoVs 7 (detection areas) of the sensors 3 of the autonomous car 1 are combined and any blind spot or invisible area due to an occlusion 9 is subtracted.

S11 denotes initializing the ideal FoV 7 for each sensor 3 of the autonomous car. S12 denotes determining occlusions 9 based on the sensor data of the respective sensor 3 and creating non-visible polygons based on the occlusions 9 for each sensor 3. S13 denotes subtracting the respective non-visible polygons from the respective ideal FoV 7 forming an altered FoV 10, for each sensor 3. S14 denotes unifying (or combining) the altered FoVs forming the dynamic FoV 14. S20 denotes creating map polygons, each of which determines edges of a road 5 or a lane 6 of the road 5 in a map of the surroundings of the autonomous car 1. S30 denotes determining visible areas in the map by intersecting the map polygons with the dynamic FoV 14. S40 denotes determining a visibility distance 12 for the road 5 or the lanes 6 of the road 5 based on the visible areas.

In FIG. 5 further a method of autonomously changing a driving lane for the autonomous car 1 is schematically depicted. Additionally to the steps S10 to S40 the steps S50 and S60 are here executed. S50 denotes making a decision about whether changing a driving lane is possible without collision based on the at least one visibility distance 12 determined for the road 5 or lanes 6 of the road 5 on dynamics of the autonomous car 1 and/or objects 8 in the surroundings of the autonomous car 1. S60 denotes affecting an autonomous driving controller of the autonomous car 1 to change the driving lane if the decision is positive.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more example or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects. In the context of the present description and claims the conjunction "or" is to be understood as including ("and/or") and not exclusive ("either . . . or").

REFERENCE SIGNS

1 Vehicle/autonomous car
2 System
3 Sensor
4 Controller
5 Road
6 Lane
7 Ideal FoV
8 Object
9 Occlusion
10 Altered FoV
11 Visibilities 12 Visibility distances
13 Midpoints
14 Dynamic FoV

The invention claimed is:

1. A method of autonomously operating a vehicle, comprising the following steps:
    initializing a respective ideal field of view for each one of plural sensors of the vehicle;
    determining occlusions caused by obstacles in the road within the respective ideal fields of view of the sensors based on sensor data of the sensors, and creating respective non-visible polygons based on the occlusions;
    subtracting the non-visible polygons from the respective ideal fields of view, to thereby form respective altered fields of view;
    unifying the altered fields of view to thereby form a dynamic field of view;
    creating map polygons, each of which determines edges of a road in a map of surroundings of the vehicle, wherein the map polygons are created based on map data of the map from a navigation system of the vehicle and localization data from a GPS system of the vehicle;
    determining visible areas in the map by intersecting the map polygons with the dynamic field of view;
    determining at least one visibility distance, relative to the vehicle, for the road based on the visible areas; and
    autonomously controlling the vehicle to perform a driving maneuver in consideration of and dependent on the at least one visibility distance.

2. The method according to claim 1, wherein said visibility distance starts at a midpoint of the road, which midpoint is in a center of the road and on a 0-longitudinal coordinates line running through a point on the vehicle and perpendicular to a length direction of the vehicle.

3. The method according to claim 2, further comprising determining the midpoint based on information from the map of the surroundings.

4. The method according to claim 1, further comprising determining the occlusions based on the obstacles which are represented by static or dynamic objects identified based on the sensor data.

5. The method according to claim 1, wherein the unifying of the altered fields of view is performed for a predefined height of the obstacles based on the sensor data.

6. The method according to claim 1, wherein the map polygons further determine edges of lanes of the road, and wherein the determining of the at least one visibility distance comprises determining a respective said visibility distance for each one of said lanes.

7. The method according to claim 6, wherein the determining of the at least one visibility distance further comprises determining a respective said visibility distance for the road overall.

8. The method according to claim 1, wherein the determining of the at least one visibility distance comprises determining a respective said visibility distance respectively in front of the vehicle and behind the vehicle.

9. The method according to claim 1, wherein the determining of the occlusions is further based on information about road geometry of the road derived from the map of the surroundings of the vehicle.

10. The method according to claim 1, further comprising:
    with a processor, making a lane change determination about whether changing a driving lane of the vehicle is possible without collision based on the at least one visibility distance, dynamics of the vehicle, and/or objects in the surroundings of the vehicle; and
    wherein the driving maneuver is performed by an autonomous driving controller of the vehicle and comprises changing the driving lane of the vehicle when the lane change determination is affirmative.

11. A system configured for autonomously operating a vehicle, comprising:
    plural sensors configured to detect objects in surroundings of the vehicle; and
    an autonomous vehicle controller configured:
        to initialize a respective ideal field of view for each one of the sensors;
        to determine occlusions caused by obstacles in the road represented by the objects detected within the respective ideal fields of view of the respective sensors based on sensor data of the sensors, and to create respective non-visible polygons based on the occlusions;
        to subtract the non-visible polygons from the respective ideal fields of view, to thereby form respective altered fields of view;
        to unify the altered fields of view to thereby form a dynamic field of view;
        to create map polygons, each of which determines edges of a road in a map of surroundings of the vehicle, wherein the map polygons are created based on map data of the map from a navigation system of the vehicle and localization data from a GPS system of the vehicle;
        to determine visible areas in the map by intersecting the map polygons with the dynamic field of view;
        to determine at least one visibility distance, relative to the vehicle, for the road based on the visible areas; and
        to autonomously control the vehicle to perform a driving maneuver in consideration of and dependent on the at least one visibility distance.

12. A combination comprising the system according to claim 11 mounted on a vehicle body of the vehicle, wherein the vehicle is an autonomous vehicle.

* * * * *

UNITED STATES PATENT AND TRADEMARK OFFICE
CERTIFICATE OF CORRECTION

PATENT NO. : 11,285,953 B2
APPLICATION NO. : 16/450184
DATED : March 29, 2022
INVENTOR(S) : Cristian Burca Page 1 of 1

It is certified that error appears in the above-identified patent and that said Letters Patent is hereby corrected as shown below:

On the Title Page

Item (30) Foreign Application Priority Data,
After "(EP) . . . . ." replace "8465543" with --18465543.9--;

In the Specification

Column 7,
Line 18, after "ing to the" delete "a";
Line 18, after "invention which" replace "comprise's" with --comprises--.

Signed and Sealed this
Fifth Day of July, 2022

Katherine Kelly Vidal
*Director of the United States Patent and Trademark Office*